United States Patent Office 3,502,195
Patented Mar. 24, 1970

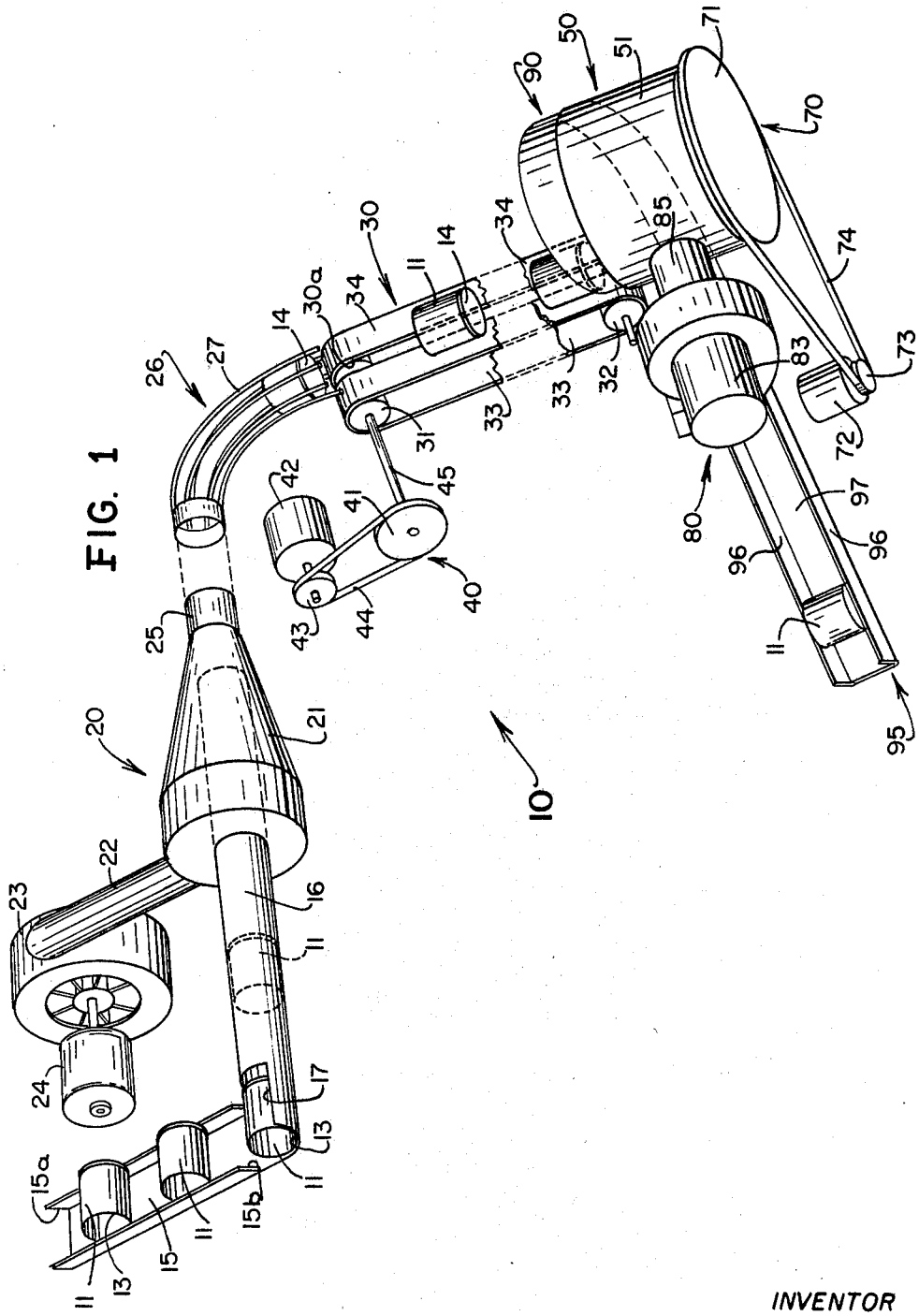

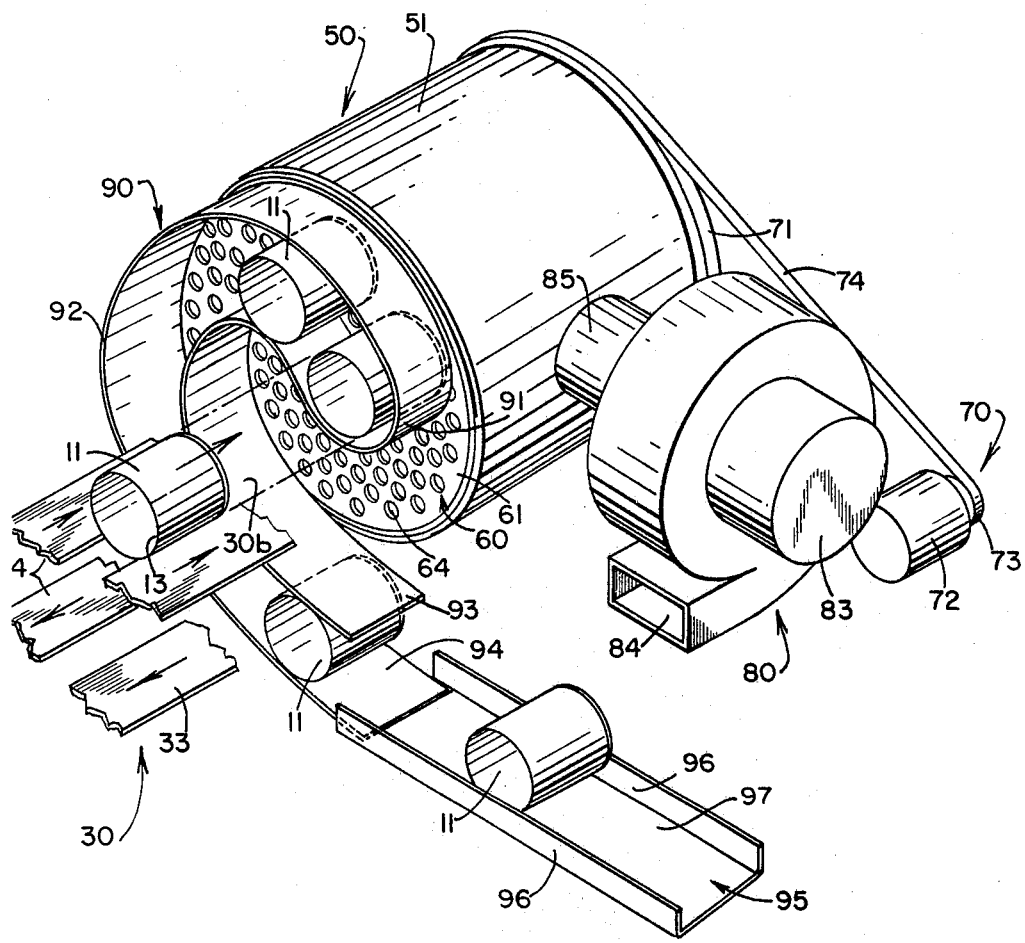

3,502,195
CONVEYING AND TRANSFER MECHANISM
William R. Benner, 126 W. Bluff St.,
Streator, Ill. 61364
Filed June 19, 1968, Ser. No. 738,269
Int. Cl. B65g 47/24, 37/60
U.S. Cl. 198—33                               28 Claims

ABSTRACT OF THE DISCLOSURE

There is disclosed a conveying and transfer mechanism which comprises a feed conveyor for conveying containers closed-ends first in the direction of the longitudinal axes thereof, a transfer plate rotatably mounted adjacent to the feed conveyor and having a receiving surface for receiving the containers, drive mechanism for rotating the transfer plate, retention mechanism for releasably holding the containers against the receiving surface during rotation of the transfer plate, and a diverter to remove the containers from the transfer plate and to deliver them in a direction normal to the axes of the containers.

---

This invention is directed to a conveying and transfer mechanism for changing the direction of travel of containers with respect to the axes thereof while the containers are traveling at a high rate of speed.

It is an important object of this invention to provide a conveying and transfer mechanism for handling containers each having a longitudinal axis and a closed end disposed transversely to the axis thereof, the mechanism comprising a feed conveyor for conveying the containers in a first direction with the axes thereof oriented essentially in the first direction and with the closed ends thereof disposed in and essentially transverse to the first direction, a transfer plate mounted for rotation adjacent to the discharge end of the feed conveyor and having a planar container receiving surface disposed toward the feed conveyor and substantially transverse to the first direction for receiving containers with the closed ends thereof against the receiving surface, drive mechanism for rotating the transfer plate, retention mechanism associated with the transfer plate for releasably gripping and holding the closed ends of the containers against the receiving surface during rotation of the transfer plate, and a diverter mounted adjacent to the receiving surface for engaging the containers held thereon during rotation of the transfer plate to remove the containers from the transfer plate and to deliver the containers in a second direction with the axes thereof oriented essentially normal to the second direction and with the closed ends thereof disposed essentially parallel to the second direction.

Another object of the invention is to provide a conveying and transfer mechanism of the type described, wherein the retention mechanism comprises a plurality of air inlet openings on the receiving surface of a size relatively small with respect to the size of the closed ends of the containers, and a source of subatmospheric pressure in communication with the air inlet openings releasably to hold the closed ends of the containers against the receiving surface during rotation of the transfer plate.

Another object is to provide a conveying and transfer mechanism of the type described, wherein the feed conveyor comprises a conveyor belt for frictionally supporting and transporting containers in the first direction with the axes thereof oriented essentially in the first direction and drive mechanism for operating the conveyor belt, the conveyor belt frictionally engaging and continually urging the containers against the receiving surface of the transfer plate until the retention mechanism has gripped the containers against the receiving surface.

Another object, in connection with the foregoing object, is to provide a drive mechanism for the conveyor belt which is adjustable to permit selection of the conveyor belt speed.

Another object of the invention is to provide a conveying and transfer mechanism of the type described wherein the diverter is mounted adjacent to the receiving surface and includes a loading section and an outer guiding section and an inner guiding section, the loading section receiving the containers from the feed conveyor and supporting the containers until gripping thereof by the retention mechanism, the outer and inner guiding sections co-operating to guide the containers across and to the edge of the receiving surface and thus to deliver the containers in the second direction with the axes thereof oriented essentially normal to the second direction and with the closed ends thereof disposed essentially parallel to the second direction.

Further features of the invention pertain to the particular arrangement of the parts of the conveying and transfer mechanism, whereby the above outline and additional operating features thereof are attained.

The invention, both as to its organization and method of operation, together with further objects and advantages thereof, will best be understood by reference to the following specification taken in connection with the accompanying drawings, in which:

FIGURE 1 is a perspective view of a conveying and transfer mechanism incorporating the features of the present invention;

FIG. 3 is a side-elevational view of the conveying and transfer mechanism of FIG. 2, with portions broken away;

FIG. 4 is a top plan view of the conveying and transfer mechanism of FIG. 2, with portions broken away; and FIG. 5 is a front elevational view of the conveying and transfer mechanism of FIG. 2.

Figure 2:
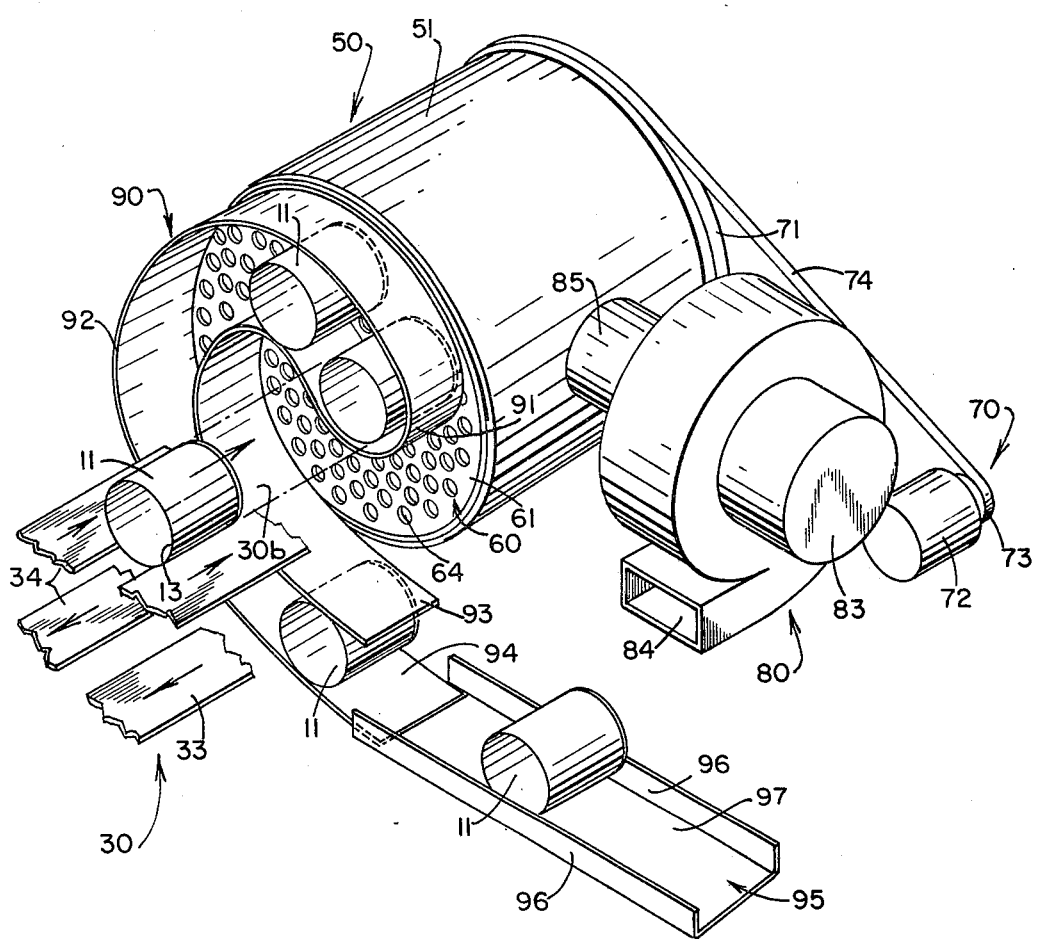
FIG. 2 is a perspective view showing certain portions of the conveying and transfer mechanism of FIG. 1 in greater detail.

Referring now to the drawings, and more particularly to FIG. 1 thereof, there is shown a conveying and transfer mechanism 10 including a chute or trough 15 inclined from the inlet 15a thereof downwardly. The lowermost end of the chute 15 constitutes an outlet 15b and is connected to a tube 16 at a cutout 17 therein. The tube 16 is coupled to an accelerator 20 which includes a conical wall defining therein a chamber 21. The chamber 21 communicates with the outlet of a blower 23 by way of a duct 22, the blower 23 being operated by a motor 24, which preferably and as illustrated is an electrical motor. The output of the accelerator 20 is coupled to an outlet tube 25 which is partially shown in broken lines so as to indicate that other accelerators similar to accelerator 20 may be disposed therein. As illustrated, the outlet or right-hand end of the tube 16 extends well into the chamber 21 and terminates adjacent to but spaced from the inlet end of the tube 25, whereby to provide a venturi section therebetween. In accordance with principles well understood by those skilled in this art, the passage of a high velocity air stream through the thus formed venturi section creates an area of subatmospheric pressure at the outer end of the tube 16, thereby to draw additional conveying air from the atmosphere through the lefthand end of the tube 16 and thus into the accelerator 20. This latter conveying air serves to carry the containers 11 from the lower end of the chute 15 into the tube 16 and eventually into the tube 25 where the air from the blower 23 joins the aforesaid conveying air rapidly to push the containers 11 through the tube 25 and the subsequent conveying structures.

The output of the tube 25 is coupled to a channel 26 comprised of a plurality of rods 27 or the like arranged to provide a curved passage, the rods 27 being shown as having a 90° bend or curve therein. The output of the channel 26 is operatively coupled to a feed conveyor 30.

In operation, containers such as cans 11, having one end 13 open and the other end 14 closed, are placed on the chute 15 at the top or inlet 15a, either by hand or by some preceding container processing stage. The longitudinal axes of the containers 11 are disposed substantially normal to the direction in which the containers 11 will travel down the chute 15, and the closed ends 14 of the containers 11 are disposed in planes parallel to the direction in which the containers 11 will travel down the chute 15 and further are disposed toward the right as viewed in FIG. 1. Because the chute 15 is inclined downwardly, and because the containers 11 as illustrated are cylindrical and of circular cross section, the containers 11 will roll, under the urging of gravity, down from the chute inlet 15a to the outlet 15b and thence to the cutout 17 in the tube 16. The containers 11 will come to rest on the inside surface of the tube 16 with the close end 14 continuing to face to the right as viewed in FIG. 1, and with the longitudinal axes of the containers 11 disposed parallel to the axis of the tube 16. By an operation which is generally well-known in the art, the accelerator 20 serves to move the containers 11 through the tube 16 toward the right, as viewed in FIG. 1. However, in order fully to appreciate the operation and construction of the mechanism 10, a brief description of the operation of the accelerator 20 follows. When energized, the motor 24 drives the blower 23 so as to force air through the duct 22 and into the chamber 21 and through the venturi section between the adjacent ends of the tubes 16 and 25, the resultant venturi effect at the exit of the tube 16 creating a substantial force tending to move the containers 11 through the tube 16 and towards the right. Of course a substantial momentum is imparted to the containers 11 as they enter the tube 25 so that they continue to move to the right after they have passed through the accelerator 20. If the path which is to be traversed by the containers 11 is to be long, then additional accelerators 20 would be provided in the broken-line portion of the outlet tube 25, whereupon a container 11 exiting from accelerator 20 would be received by the next accelerator, etc., until the container arrives at its destination.

After leaving the tube 25, the containers 11 travel through the channel 26 so as to change the direction of travel thereof by 90°, but continuing to maintain the longitudinal axes of the containers 11 in the same direction as the direction of travel, the containers 11 being delivered thereby to the feed conveyor 30.

The feed conveyor 30 includes a pair of laterally-extending and longitudinally-spaced-apart rotatably-mounted frictional cylinders 31 and 32. (The means for rotatably mounting the cylinders 31 and 32 is not shown.) A pair of laterally-spaced-apart endless belts 33 and 34 is carried and frictionally engaged by the cylinders 31 and 32, the cylinders 31 and 32 being positioned with respect to each other such that the belts 33 and 34 are essentially taut throughout their respective extents. The outlet of the channel 26 is disposed immediately above the upper surfaces of the belts 33 and 34 and aligned with the space therebetween.

The conveying and transfer mechanism 10 further comprises a drive mechanism 40 including a shaft 45 on the frictional cylinder 31 and extending longitudinally outwardly therefrom, the free end of the shaft 45 carrying thereon a wheel 41 having a V-channel in the periphery thereof. The drive mechanism 40 also includes a variable speed motor 42 carrying a smaller diameter wheel 43 also having a V-channel in the periphery thereof. A V-belt 44 frictionally engages the wheels 41 and 43, the motor 42 being mounted with respect to the shaft 45 so as to maintain the V-belt 44 essentially taut. Preferably the motor 42 has an adjustment thereon for varying the speed thereof.

In operation, the containers 11 are fed, closed end 14 first, onto the belts 33 and 34, lateral movement of the containers 11 being retarded by their being seated between the belts 33 and 34. Energization of the motor 42 rotates the wheel 43 which, by way of the belt 44, rotates the wheel 41 to, in turn, rotate the shaft 45 and finally to rotate the frictional cylinder 31.

The belts 31 and 34, by reason of the frictional engagement thereof with the cylinders 31 and 32, are caused to move longitudinally and define a conveyor inlet 30a adjacent the cylinder 31 and a conveyor outlet 30b adjacent the cylinder 32. The characteristics of the motor 42 are such as to turn the cylinder 31 in the clockwise direction, as viewed in FIG. 1, so as to drive the upper surfaces of the belts 33 and 34 longitudinally from the inlet 30a toward the outlet 30b. The longitudinal axes of the containers 11 continue to be disposed in the direction of travel as the containers are fed onto the belts 33 and 34 and travel thereon.

Referring now to FIGS. 2 through 5, positioned adjacent to the bets 33 and 34 adjacent the outlet 30b thereof is a transfer mechanism 50, including a cylindrical housing 51. Provided on the rear edge of the housing 51 and preferably integral therewith is a cover plate 58. A pair of legs 52 and 53 have the ends thereof respectively integral with a pair of feet 52a and 53a mounted on the inside surface of the housing 51 at spaced-apart points thereon, the legs 52 and 53 converging and being joined to a hub 54. On the outside surface of the cover plate 58 and attached thereto is a bearing 55, a shaft 56 being journaled through the hub 54 and through the bearing 55, whereby to rotatably mount the shaft 56 to the cylindrical housing 51. Lastly, there is provided an outlet 57 (FIG. 3) in the curved surface of the cylindrical housing 51.

The transfer mechanism 50 further includes a circular transfer plate 60 having a receiving surface 61 and a rear surface 62, the transfer plate 60 having therein a plurality of circular air inlet openings 64 substantially covering the receiving surface 61. Disposed on the rear surface 62, approximately centrally thereof, is a bearing 63 through which is journaled the front end of the shaft 56, thereby to rotatably mount the transfer plate 60 to the housing 51.

The transfer mechanism 50 also includes a drive mechanism 70 which includes a relatively-large wheel 71 having a V-shaped channel in the periphery thereof. The drive mechanism 70 also includes a motor 72 carrying thereon a smaller wheel 73 having a V-shaped channel in the periphery thereof. A V-shaped belt is disposed in operative contact with the wheels 71 and 73, the motor 72 being positioned with respect to the housing 51 such as to render the belt 74 taut between the two wheels 71 and 73.

Energization of the motor 72 rotates the wheel 73 which, by way of the belt 74, rotates the wheel 71 to, in turn, rotate the shaft 56, and finally to rotate the transfer plate 60. The characteristics of the motor 72 are such as to turn the transfer plate 60 in the counterclockwise direction, as viewed in FIG. 2.

The transfer mechanism 50 lastly includes a blower 80, the blower 80 including a duct 85 communicating with the opening 57 in the cylindrical housing 51. There is also provided an impeller 81 rotatably mounted on a shaft 52, the impeller 81 communicating with an outlet 84 and with the duct 85. The blower 80 also includes a motor 83 operatively connected to the shaft 82 for rotation thereof.

Upon energization of the motor 83, the impeller 81 is caused to rotate in the direction thereof to draw air from the atmosphere through the air inlet openings 64 in the transfer plate 61, through the cylindrical housing 51 and the duct 95, and to expel the air through the outlet 84, thereby to define a source of subatmospheric pressure communicating with the openings 64. As previously explained, the containers 11 have the closed ends 14 thereof facing the transfer mechanism 50 and have the longitudinal axes thereof disposed in the direction in which they move. The containers 11 are transported by the belts 33 and 34 so as to continually urge the containers 11 against the receiving surface 61 of the transfer plate 60. Upon contact of the closed ends 14 with the receiving surface 61, the suction created by the drawing of air through the air inlet openings 64 causes the closed ends 14 of the containers 11 to be releasably gripped and held against the receiving surface 61. The containers 11 are carried in a counterclockwise direction while held on the transfer plate 61 by reason of the counterclockwise rotation thereof.

The conveying and transfer mechanism 10 finally comprises a diverter 90, the diverter 90 including an upwardly-curved loading section 91 disposed above a horizontal plane passing through the rotation axis of the transfer plate defined by the shaft 56 and disposed on the side of a vertical plane passing through the rotation axis of the transfer plate 60 in which the transfer plate 60 is rising. The diverter 90 also includes an outer guiding section 92 that is part circular and is disposed adjacent to the circumference of the transfer plate 60 along approximately 180° thereof. The outer guiding section 92 spirals outwardly from the free end of the part-circular portion past the periphery of the transfer plate 60 and terminates in a generally-horizontal portion. The diverter 90 finally includes an inner guiding section 93 that is part circular and adjacent to the center of the transfer plate 91 and concentric therewith for approximately 180° thereof. The inner guiding section 93 spirals outwardly from the free end of the part-circular portion past the periphery of the transfer plate 60 and terminates in a generally-horizontal portion. The spacing between the guiding sections 92 and 93 is generally uniform, the ends thereof defining an output 94.

The containers 11 are fed onto the transfer plate 60 above the horizontal plane that passes through the shaft 56 by an angle $x$, the loading section 91 being disposed beneath the containers 11 so as to support the containers 11 when immediate retention by the transfer plate is not achieved. As the transfer plate 60 rotates in the counterclockwise direction with the containers 11 held thereon, centrifugal forces tend to move the containers 11 toward the edge thereof, such movement being limited by the outer guiding section 92. The containers 11 are prevented from continued rotation with the transfer plate 60, due to the presence of the inner guiding section 93 which stops continued movement of the containers 11 and causes them to drop and to be delivered to the outlet 94 with their longitudinal axes oriented essentially normal to the direction of travel.

Finally, there is provided a delivery conveyor or chute 95 having a pair of longitudinally-extending side walls 96 and a support surface 97 disposed between the side walls 96 and integral therewith, the input of the chute 95 being aligned with the diverter 90.

The containers 11 that leave the diverter 90 at the outlet 94 thereof are guided onto the delivery conveyor 95, the containers 11 then rolling upon the surface 97 to the succeeding processing stage.

In operation, containers 11 are to be rapidly transported from the inlet 15a of the chute 15 to the outlet of the chute 95. Both at the input and at the output, present practices dictate that the containers 11 be in a position to be rolled, that is, the longitudinal axes of the containers extend normal to the direction in which the containers 11 are to move. However, in order that the containers 11 be rapidly transported over long distances, it has been learned that they should be disposed with their longitudinal axes in the direction in which they travel. It is accordingly necessary that the longitudinal axes of the containers 11 be first disposed normal to the direction of travel when the containers 11 are rolling, and then the longitudinal axes of the containers 11 be disposed in the same direction they travel when the containers are being transported over a substantial distance, and, finally the longitudinal axes of the container 11 must again be disposed normal to the direction of the travel to accommodate rolling movement thereof.

The containers, having one end 13 open and the other end 14 closed, are placed on the chute 15 at the inlet 15a, such that the longitudinal axes of the containers 11 are disposed substantially normal to the direction in which the containers will roll down the chute 15 and such that the closed ends 14 face toward the right, as viewed in FIG. 1. The containers 11 will roll, under the urging of gravity, down the chute 15 to the tube 16, the axes of the containers 11 being parallel to the axis of the tube 16 and parallel to the direction of travel of the containers 11 along the tube 16. The accelerator 20 draws the containers 11 through the tube 16 at high speeds and around the bend in the channel 26 to enter the conveyor 30 at the inlet 30a, such that the closed ends 14 continue to face in the direction of travel and such that the longitudinal axes of the containers 11 also continue to be in the direction of travel.

Now that the containers 11 have traveled at a high rate of speed to their destination with the longitudinal axes thereof in the direction of travel, it is necessary to change the manner of travel of the containers 11 such that their axes are disposed normal to the direction of travel. This is accomplished while the containers 11 are moving at a relatively-high rate of speed, the change being effected by the transfer mechanism 50.

The containers 11 are fed, closed end 14 first, onto the belts 33 and 34 at the inlet 30a thereof, and become seated within the space therebetween and are carried toward the transfer mechanism 50. The speed of travel of the containers 11 on the belts 33 and 34 is determined by the speed of the motor 42, the speed being adjusted to match the speed of the containers 11 through the channel 26 to the speed of the transfer plate 60. If the belts 33 and 34 travel too slowly, the containers 11 will back up within the channel 26 and the tubes 16 and 25. If the belts 33 and 34 travel too fast, the containers 11 will become jammed up at the transfer mechanism 50 as the transfer plate 60 wil not rotate fast enough to remove each container 11 as it comes.

The belts 33 and 34 carry the containers 11, closed end first, urging them against the receiving surface 61 until the containers are gripped on the transfer plate 60 by the retention mechanism defined by the blower 80 and the openings 61 in the plate 60. The loading section 91 of the diverter 90 prevents the containers 11 from falling until good gripping has been attained.

An impeller 81 in the blower 80 draws air from the atmosphere through the air inlet openings 64 in the transfer plate 61 through the cylindrical housing 51 and the duct 85, and expels the air through the outlet 84, thereby to create a force which releasably grips and holds the the containers 11 against the receiving surface 61. Simultaneously, the transfer plate is being rotated in the counterclockwise direction as viewed in FIG. 5. When the containers 11 strike the inner guiding section 93 of the diverter 90, the containers 11 will be guided thereby onto the delivery conveyor 95 where the longitudinal axes of the containers 11 are disposed normal to the direction of travel to permit the containers to roll along the delivery conveyor 95. Any tendency of the containers 11 to be thrown by centrifugal force from the transfer plate 60 is prevented by the outer guiding section 92 which is in the path of the containers.

In an illustrative example, the conveying and transfer mechanism 10 was constructed as follows: the angle $x$ at which the containers 11 were delivered to the transfer plate 60 was 35°; the cylindrical housing 51 had an axial length of 10 inches; the transfer plate 60 had a diameter of 12 inches; there were four rows of openings 64 in the transfer plate 60, each having a three-eighth inch diameter and each being spaced from the adjacent hole by three-fourths of an inch. With such a construction, the conveying and transfer mechanism 10 was operable to convey and change the orientation of containers traveling at the rate of 1,000 units per minute.

If the containers 11 are fragile, such as glass jars or bottles, a layer of rubber or other cushioning material is bonded to the receiving surface 61 of the transfer plate 60, thereby to cushion the container 11 as it is urged against the receiving surface 61.

What has been described, therefore, is a conveying and transfer mechanism which is adapted to change the direction of travel of containers with respect to the axes thereof while the containers are traveling at a high rate of speed.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A conveying and transfer mechanism for handling containers each having a longitudinal axis and a closed end disposed transversely to the axis thereof, said mechanism comprising a feed conveyor for conveying the containers in a first direction with the axes thereof oriented essentially in said first direction and with the closed ends thereof disposed in and essentially transverse to said first direction, a transfer plate mounted for rotation adjacent to the discharge end of said feed conveyor and having a planar container receiving surface disposed toward said feed conveyor and substantially transverse to said first direction for receiving containers with the closed ends thereof against said receiving surface, drive mechanism for rotating said transfer plate, retention mechanism associated with said transfer plate for releasably gripping and holding the closed ends of the containers against said receiving surface during rotation of said transfer plate, and a diverter mounted adjacent to said receiving surface for engaging the containers held thereon during rotation of said transfer plate to remove the containers from said transfer plate and to deliver the containers in a second direction with the axes thereof oriented essentially normal to said second direction and with the closed ends thereof disposed essentially parallel to said second direction.

2. The conveying and transfer mechanism set forth in caim 1, and further comprising a delivery conveyor mounted adjacent to said diverter for receiving the containers in said second direction with the axes thereof oriented essentially normal to said second direction and with the closed ends thereof disposed essentially parallel to said second direction.

3. The conveying and transfer mechanism set forth in claim 1, wherein each of the containers has a circular cross section, and said delivery conveyor is a trough, whereby to accommodate rolling of the containers along the trough.

4. A conveying and transfer mechanism for handling containers each having a longitudinal axis and a closed end disposed transversely to the axis thereof, said mechanism comprising a feed conveyor for conveying the containers in a first direction with the axes thereof oriented essentially in said first direction and with the closed ends thereof disposed in and essentially transverse to said first direction, a transfer plate mounted for rotation adjacent to the discharge end of said feed conveyor and having a planar container receiving surface disposed toward said feed conveyor and substantially transverse to said first direction for receiving containers with the closed ends thereof against said receiving surface, drive mechanism for rotating said transfer plate, said receiving surface having a plurality of air inlet openings therein of a size relatively small with respect to the size of the closed ends of the containers, a source of subatmospheric pressure in communication with said air inlet openings for drawing air therethrough releasably to hold the closed-ends of the containers against said receiving surface during rotation of said transfer plate, and a diverter mounted adjacent to said receiving surface for engaging the containers held thereon during rotation of said transfer plate to remove the containers from said transfer plate and to deliver the containers in a second direction with the axes thereof oriented essentially normal to said second direction and with the closed ends thereof disposed essentially parallel to said second direction.

5. The conveying and transfer mechanism set forth in claim 4, wherein said air inlet openings substantially cover said planar container-receiving surface.

6. The conveying and transfer mechanism set forth in claim 4, wherein said source of subatmospheric pressure is a blower having an inlet communicating with said air inlet openings and an outlet, said blower being operative to draw air from the atmosphere through said air inlet openings and to discharge the air through said outlet, thereby to create suction releasably to hold the containers against said receiving surface.

7. The conveying and transfer mechanism set forth in claim 4, wherein said transfer plate is circular, and further comprising a closed housing having an outlet and having a circular opening for rotatably receiving said transfer plate, said source of subatmospheric pressure communicating with said outlet.

8. A conveying and transfer mechanism for handling containers each having a longitudinal axis and a closed end disposed transversely to the axis thereof, said mechanism comprising a conveyor belt for frictionally supporting and transporting containers in a first direction with the axes thereof oriented essentially in said first direction and with the closed ends thereof disposed in and essentially transverse to said first direction, first drive mechanism for operating said conveyor belt, a transfer plate mounted for rotation adjacent to the discharge end of said feed conveyor and having a planar container receiving surface disposed toward said feed conveyor and substantially transverse to said first direction for receiving containers with the closed ends thereof against said receiving surface, second drive mechanism for rotating said transfer plate, retention mechanism associated with said transfer plate for releasably gripping and holding the closed ends of the containers against said receiving surface during rotation of said transfer plate, said conveyor belt frictionally engaging and continually urging the containers against said receiving surface until said retention mechanism has gripped the containers against said receiving surface, and a diverter mounted adjacent to said receiving surface for engaging the containers held thereon during rotation of said transfer plate to remove the containers from said transfer plate and to deliver the containers in a second direction with the axes thereof oriented essentially normal to said second direction and with the closed ends thereof disposed essentially parallel to said second direction.

9. The conveying and transfer mechanism set forth in claim 8, wherein said conveyor belt includes two parallel spaced-apart endless sections.

10. The conveying and transfer mechanism set forth in claim 8, wherein one of said drive mechanisms is adjustable.

11. The conveying and transfer mechanism set forth in claim 8, wherein said first drive mechanism is adjustable.

12. A conveying and transfer mechanism for handling containers each having a longitudinal axis and a closed end disposed transversely to the axis thereof, said mechanism comprising a feed conveyor for conveying the containers in a first direction with the axes thereof oriented essentially in said first direction and with the closed ends thereof disposed in and essentially transverse to said first direction, a transfer plate mounted for rotation adjacent to the discharge end of said feed conveyor and having a planar container receiving surface disposed toward said feed conveyor and substantially transverse to said first direction for receiving containers with the closed ends thereof against said receiving surface, drive mechanism for rotating said transfer plate, retention mechanism associated with said transfer plate for releasably gripping and holding the closed ends of the containers against said receiving surface during rotation of said transfer plate, and a diverter mounted adjacent to said receiving surface and including a loading section and an outer guiding section and an inner guiding section, said loading section receiving the containers from said feed conveyor and supporting the containers until gripping thereof by said retention mechanism, said outer and inner guiding section co-operating to guide the containers across and to the edge of said receiving surface and thus to deliver the containers in a second direction with the axes thereof oriented essentially normal to said second direction with the closed ends thereof disposed essentially parallel to said second direction.

13. The conveying and transfer mechanism set forth in claim 12, wherein said loading section is in the quadrant of said receiving surface that is above a horizontal plane that passes through the rotation axis of said transfer plate and on the side of said rotation axis on which said receiving surface is rising.

14. The conveying and transfer mechanism set forth in claim 12, wherein the longitudinal axis of a container delivered to said transfer plate is above the horizontal plane that passes through the rotation axes of said transfer plate by an angle on the order of 35°.

15. The conveying and transfer mechanism set forth in claim 12, wherein said outer guiding section has a part-circular portion that is generally coextensive with part of the circumference of said transfer plate and disposed adjacent thereto, and has a spiraled portion that spirals outwardly from the free end of said part-circular portion.

16. The conveying and transfer mechanism set forth in claim 12, wherein said inner guiding section has a part-circular portion that is generally concentric with said transfer plate and disposed adjacent thereto, and has a spiral portion that spirals outwardly from the free end of said part-circular portion.

17. The conveying and transfer mechanism set forth in claim 12, wherein said outer guiding section has an outer part-circular portion that is generally coextensive with part of the circumference of said transfer plate and disposed adjacent thereto, and has an outer spiraled portion that spirals outwardly from the free end of said outer part-circular portion, and said inner guiding section has an inner part-circular portion that is generally concentric with said transfer plate and disposed adjacent thereto, and has an inner spiral portion that spirals outwardly from the free end of said inner part-circular portion, and the spacing between said inner and outer spiral portions is generally uniform and is generally equal to the spacing between said inner and outer part-circular portions.

18. A transfer mechanism for handling containers having a longitudinal axis and a closed end disposed transversely to the axis thereof, said mechanism comprising a transfer plate mounted for rotation about a rotation axis oriented in a first direction and having a planar container receiving surface disposed substantially normal to said first direction for receiving containers conveyed thereto in said first direction with the axes thereof oriented essentially in said first direction and with the closed ends thereof disposed in and essentially transverse to said first direction, drive mechanism for rotating said transfer plate about said rotation axis, retention mechanism associated with said transfer plate for releasably holding the closed ends of the containers against said receiving surface during rotation of said transfer plate, and a diverter mounted adjacent to said receiving surface for engaging the containers held thereon during rotation of said transfer plate to remove the containers from said transfer plate and to deliver the containers in a second direction with the axes thereof oriented essentially normal to said second direction and with the closed ends thereof disposed essentially parallel to said second direction.

19. A transfer mechanism for handling containers having a longitudinal axis and a closed end disposed transversely to the axis thereof, said mechanism comprising a transfer plate mounted for rotation about a rotation axis oriented in a first direction and having a planar container receiving surface disposed substantially normal to said first direction for receiving containers conveyed thereto in said first direction with the axes thereof oriented essentially in said first direction and with the closed ends thereof disposed in and essentially transverse to said first direction, drive mechanism for rotating said transfer plate about said axis, said receiving surface having a plurality of air inlet openings therein of a size relatively small with respect to the size of the closed ends of the containers, a source of subatmospheric pressure in communication with said air inlet openings for drawing air therethrough releasably to hold the closed ends of the containers against said receiving surface during rotation of said transfer plate, and a diverter mounted adjacent to said receiving surface for engaging the containers held thereon during rotation of said transfer plate to remove the containers from said transfer plate and to deliver the containers in a second direction with the axes thereof oriented essentially normal to said second direction and with the closed ends thereof disposed essentially parallel to said second direction.

20. The transfer mechanism set forth in claim 19, wherein said air inlet openings substantially cover said planar container-receiving surface.

21. The transfer mechanism set forth in claim 19, wherein said source of subatmospheric pressure is a blower having an inlet communicating with said air inlet openings and an outlet, said blower being operative to draw air from the atmosphere through said air inlet openings and to discharge the air through said outlet, thereby to create suction releasably to hold the closed ends of the containers against said receiving surface.

22. The transfer mechanism set forth in claim 19, wherein said transfer plate is circular, and further comprising a closed housing having an outlet and having a circular opening for rotatably receiving said transfer plate, said source of subatmospheric pressure communicating with said outlet.

23. A transfer mechanism for handling containers having a longitudinal axis and a closed end disposed transversely to the axis thereof, said mechanism comprising a transfer plate mounted for rotation about an axis oriented in a first direction and having a planar container receiving surface disposed substantially normal to said first direction for receiving containers conveyed thereto in said first direction with the axes thereof oriented essentially in said first direction and with the closed ends thereof disposed in and essentially transverse to said first direction, drive mechanism for rotating said transfer plate about said axis, retention mechanism associated with said transfer plate for releasably holding the closed ends of the containers against said receiving surface during rotation of said transfer plate, and a diverter mounted adjacent to said receiving surface and including a loading section and and an outer guiding section and an inner guiding section, said loading section receiving the containers from said feed conveyor and supporting the containers until gripping thereof by said retention mechanism, said outer and inner guiding sections co-operating to guide the containers across and to the edge of said receiving surface and thus to deliver the containers in a second direction with the axes thereof oriented essentially normal to said second direction with the closed ends thereof disposed essentially parallel to said second direction.

24. The transfer mechanism set forth in claim 23, wherein said loading section is in the quadrant of said receiving surface that is above a horizontal plane that passes through the rotation axis of said transfer plate and on the side of said rotation axis on which said receiving surface is rising.

25. The transfer mechanism set forth in claim 23, wherein the longitudinal axis of a container delivered to said transfer plate is above the horizontal plane that passes through the rotation axes of said transfer plate by an angle on the order of 35°.

26. The transfer mechanism set forth in claim 23, wherein said outer guiding section has a part-circular portion that is gentrally coextensive with part of the circumference of said transfer plate and disposed adjacent thereto, and has a spiraled portion that spirals outwardly from the free end of said part-circular portion.

27. The transfer mechanism set forth in claim 23, wherein said inner guiding section has a part-circular portion that is generally concentric with said transfer plate and disposed adjacent thereto, and has a spiral portion that spirals outwardly from the free end of said part-circular portion.

28. The transfer mechanism set forth in claim 23, wherein said outer guiding section has an outer part-circular portion that is generally coextensive with part of the circumference of said transfer plate and disposed adjacent thereto, and has an outer spiraled portion that spirals outwardly from the free end of said outer part-circular portion, and said inner guiding section has an inner part-circular portion that is generally concentric with said transfer plate and disposed adjacent thereto and has an inner spiral portion that spirals outwardly from the free end of said inner part-circular portion, and the spacing between said inner and outer spiral portions is generally uniform and is generally equal to the spacing between said inner and outer part-circular portions.

References Cited
UNITED STATES PATENTS 3,380,627  4/1968  Aidlin _____ 198—25 X EDWARD A. SROKA, Primary Examiner U.S. Cl. X.R.

198—25, 103

UNITED STATES PATENT OFFICE
CERTIFICATE OF CORRECTION

Patent No. 3,502,195  March 24, 1970

William R. Benner

It is certified that error appears in the above identified patent and that said Letters Patent are hereby corrected as shown below:

Column 2, line 52, after "output" insert -- end --. Column 3, line 22, "close" should read -- closed --. Column 4, line 23, "bets" should read -- belts --. Column 7, line 50, "caim" should read -- claim --. Column 11, line 16, "gentrally" should read -- generally --.

Signed and sealed this 8th day of December 1970.

(SEAL)
Attest:

Edward M. Fletcher, Jr.
Attesting Officer

WILLIAM E. SCHUYLER, JR.
Commissioner of Patents